United States Patent
Hampsten

[11] Patent Number: 6,047,541
[45] Date of Patent: Apr. 11, 2000

[54] HAN TEAN (XM-46) MIXING GAS GENERATOR PROPELLANT TANK PRESSURIZER FOR LAUNCH VEHICLES AND SPACECRAFT

[75] Inventor: Kenneth R. Hampsten, Albuquerque, N.Mex.

[73] Assignee: The United States of America as represented by the Secretary of the Air Force, Washington, D.C.

[21] Appl. No.: 09/150,636

[22] Filed: Aug. 26, 1998

[51] Int. Cl.$^7$ ...................................................... F02K 9/50
[52] U.S. Cl. ........................................................... 60/259
[58] Field of Search ................................... 60/39.06, 259

[56] References Cited

U.S. PATENT DOCUMENTS

| | | | |
|---|---|---|---|
| 2,935,846 | 5/1960 | Neale et al. | 60/39.48 |
| 4,385,489 | 5/1983 | Abbott | 60/39.06 |
| 4,946,521 | 8/1990 | Walker | 149/36 |
| 5,014,623 | 5/1991 | Walker | 102/477 |
| 5,060,973 | 10/1991 | Giovanetti | 280/736 |
| 5,607,181 | 3/1997 | Richardson | 280/737 |
| 5,608,179 | 3/1997 | Voecks | 89/7 |
| 5,799,902 | 9/1998 | Keith et al. | 244/55 |

OTHER PUBLICATIONS

Microcosm Inc. patent application about to issue mentioning the HAN TEAN concept; this is the present inventor's contribution and Microcosm will acknowledge it. 08/900,923 filed Jul. 7, 1997 now 5,799,902.

Primary Examiner—Charles G. Freay
Assistant Examiner—Ehud Gartenberg
Attorney, Agent, or Firm—Kenneth E. Callahan

[57] ABSTRACT

A HAN TEAN mixing gas generator pressurization system is proposed for use on pressure-fed rockets. HAN (hydroxyl ammonium nitrate) and TEAN (triethanol ammonium nitrate) are salts dissolved in water to form a single liquid propellant. Combustion of HAN TEAN results in water, carbon dioxide, and nitrogen at high temperatures and pressures. A cryogenic primary working fluid is mixed the HAN TEAN exhaust products to provide warm high-pressure gas to pressurize the rocket's main propellant tanks.

8 Claims, 2 Drawing Sheets

6,047,541

HAN TEAN (XM-46) MIXING GAS GENERATOR PROPELLANT TANK PRESSURIZER FOR LAUNCH VEHICLES AND SPACECRAFT

STATEMENT OF GOVERNMENT INTEREST

The conditions under which this invention was made are such as to entitle the Government of the United States under paragraph 1(a) of Executive Order 10096, as represented by the Secretary of the Air Force, to the entire right, title and interest therein, including foreign rights.

BACKGROUND OF THE INVENTION

1. Field of the Invention

This invention relates generally to field of pressurization systems and in particular to a mixing gas generator pressurization system for liquid propellant pressure-fed rocket systems.

2. Description of the Prior Art

Conventional liquid rocket systems have their propellants stored in tanks at relatively low pressure. Complex turbopump systems are employed to raise the propellants to the high pressure necessary to supply the rocket's combustion chamber. Pressurize-fed rocket systems are much less complex. The propellant storage tanks are pressurized to a high pressure such that the propellents can be directly injected into the rocket's combustion chamber. Normally a high-pressure gas supply is used to pressurize the tanks and expel the propellants. For large pressurize-fed rocket systems, an impracticably large pressurization system would be required to pressurize the main propellant tanks. As a consequence, large liquid propellant rockets invariably use turbopump systems.

A tank pressurization system is needed that can supply sufficient high-pressure gas for pressurize-fed liquid rocket and spacecraft systems at reduced system volume, weight, and pressure storage requirements. The HAN TEAN system of the present invention fulfills these requirements, providing a controlled rate of high-pressure gas free of harmful byproducts.

HAN TEAN is a single liquid propellant containing both an oxidizer and a fuel component. HAN (hydroxyl ammonium nitrate) is the oxidizer and TEAN (triethanol amine nitrate) is the fuel. Both components are salts that are dissolved in water. By volume, HAN TEAN is composed of 60.8% HAN, 19.2% TEAN, and 20.0% water.

HAN TEAN was originally developed by the U. S. Army for regenerative propellant gun applications. See, for example, U. S. Pat. Nos. 5,608,179, 5,014,623, and 4,946,521. HAN TEAN has also been used as a liquid fueled inflator for motor vehicle airbag systems, e.g., U. S. Pat. Nos. 5,060,973 and 5,607,181. Both of these uses essentially employed HAN TEAN as an explosive to rapidly generate large volumes of gas, either to propel an artillery shell out of a gun barrel or to rapidly inflate an air bag.

SUMMARY OF THE INVENTION

The present invention is a mixing gas generator pressurization system for pressurize-fed rocket systems. HAN TEAN is injected into a gas generator combustion chamber at 500–1500 psi to produce high temperature and high pressure combustion gases consisting of water, carbon dioxide, and nitrogen. In one embodiment, these HAN TEAN exhaust gases are mixed with a liquid nitrogen ($LN_2$) working fluid to change its phase and raise its temperature. This high-pressure warm gas is then sent to the vehicle's main propellant tanks to drive the propellants into the rocket engine's combustion chamber. An alternative version uses liquid helium as both the primary working fluid and as the pressurization medium.

DESCRIPTION OF THE PREFERRED EMBODIMENT

Figure 1:
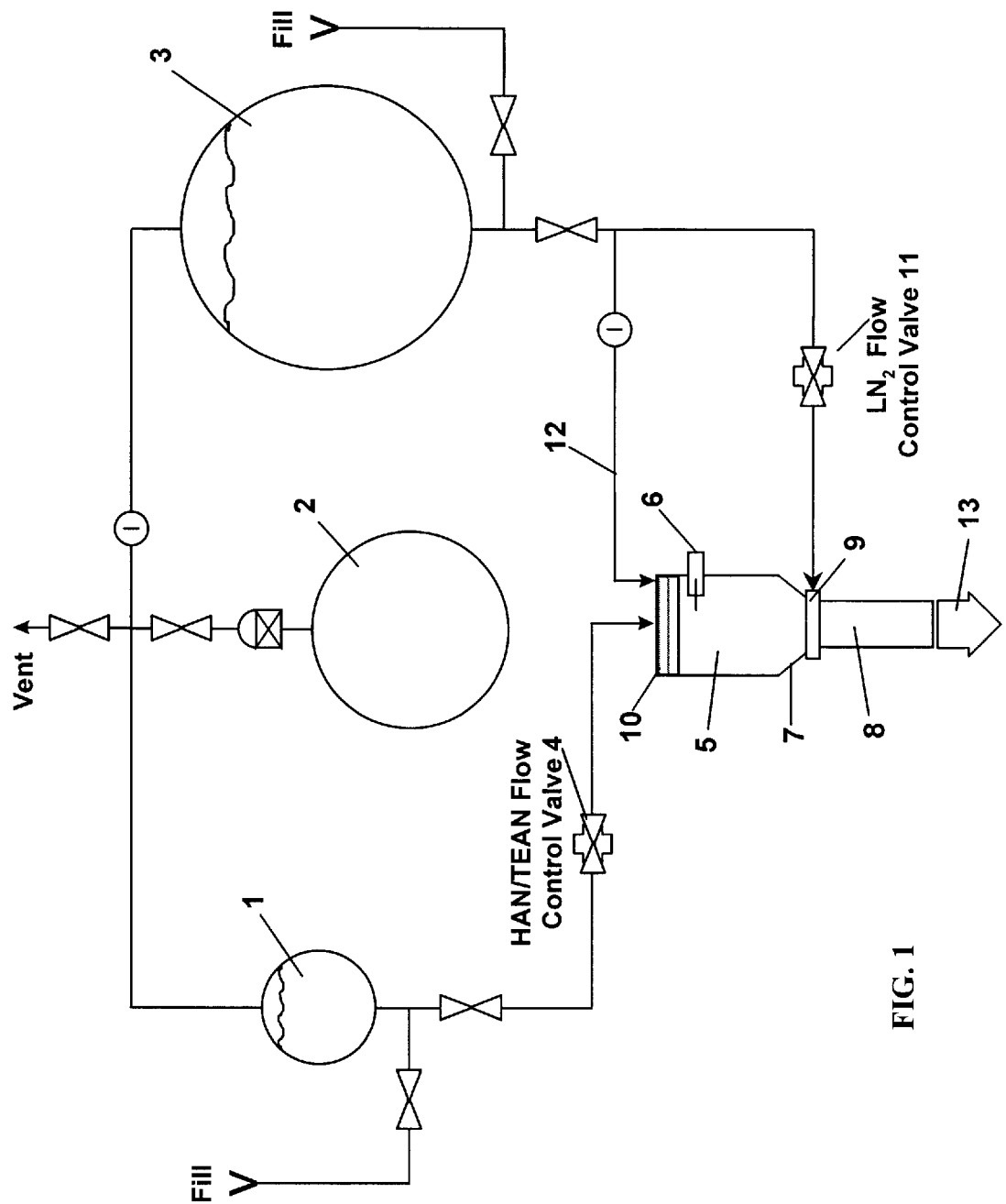
FIG. 1 shows a HAN TEAN/liquid nitrogen gas generator system.

A schematic of a HAN TEAN mixing gas generator pressurization system is shown in FIG. 1. HAN TEAN is stored in a relatively small tank 1 and pressurized to about 1500 psi by a small gaseous helium (GHe) pressurization system 2. The primary working fluid in this embodiment is liquid nitrogen ($LN_2$), or water, which is also stored in a tank 3 pressurized to about 1500 psi by the GHe system. HAN TEAN, regulated by a flow control valve 4, is injected by an integral catalyst bed/monopropellant injector 10 at about 1400 psi into a gas combustion chamber 5, ignited by a thermal or hypergol igniter 6, and burned at a temperature of about 3,200° F. and at a pressure of about 1100 psi. The products of combustion (water, carbon dioxide, and nitrogen) pass through a sonic nozzle 7 into an intimate mixer and diffuser 8.

During HAN TEAN combustion, $LN_2$ is injected through a manifold 9 into the intimate mixer and diffuser 8 to mix the cryogenic fluid with the HAN TEAN hot gas exhaust products. These hot exhaust products change the phase of $LN_2$ to a gas and raise its bulk temperature to between 150 and 250° F.

An optional catalyst bed 10 can be used to precondition the HAN TEAN propellant by exothermically decomposing the HAN into nitric acid, raising the temperature by approximately 250° F., and thus aiding ignition. Advanced catalysts may be used to actually start the reaction, thereby eliminating the igniter. The combustion products of HAN TEAN are $CO_2$, $N_2$, and $H_2O$, following the exothermic reaction: $7(NH_3OHNO_3)+(HOCH_2)_3NHNO_3 \rightarrow 6CO_2+8N_2+22H_2O$.

The ratio of hot gas flow to cryogenic flow determines the final gas temperature at the exit of the mixer 8. This is controlled by the $LN_2$ flow control valve 11. The $LN_2$ is used to regeneratively cool the gas generator 12. After mixing, the high-pressure warm gas flow 13 is sent to the vehicle's main propulsion tanks, expelling the on-board propellants to the vehicle's rocket engine(s). The gaseous nitrogen mixed with the HAN TEAN combustion products 13 exits the intimate mixer and diffuser 8 at about 150° F. with a pressure of about 550-psi. The initial pressures and temperatures used in this example are based on providing 550-psi pressure to the main vehicle tanks.

Figure 2:
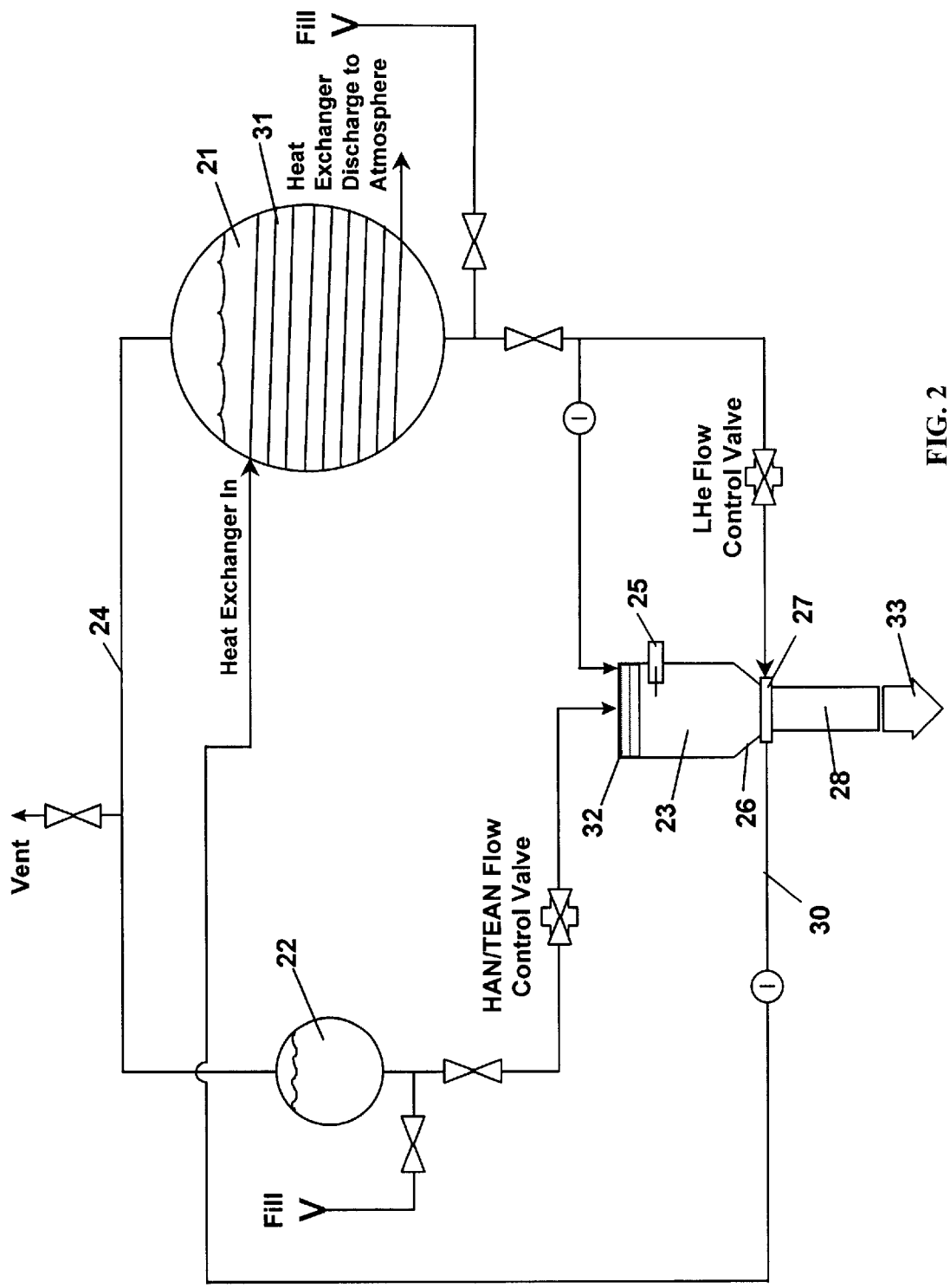
FIG. 2 is an alternative HAN TEAN/liquid helium gas generator system.

A second embodiment is shown in FIG. 2. In this simpler version, liquid helium (LHe) 21 is used as the primary working fluid. As before, HAN TEAN stored in a tank 22 is directed to a gas generator combustion chamber 23. The HAN TEAN and LHe tanks are precharged to operating pressures with gaseous helium via a common line 24 and bootstrap started. The gas generator is comprised of an igniter 25, an integral catalyst bed/monopropellant injector 32, a combustion chamber 23, an injection manifold 27, and an intimate mixer 28. After combustion, the flow passes through a sonic nozzle 26, then liquid helium is injected through the injection manifold 27 and intimately mixed and diffused with HAN TEAN combustion products 28, exiting at about 150° F. and at a pressure of about 550 psi 33.

Part of the liquid helium vaporized in the mixing manifold 27 is tapped off 30 and used as a heat source to an integral heat exchanger 31 in the LHe tank. The gaseous helium in the heat exchanger accelerates the cryogenic boil-off to maintain a constant working pressure in the HAN TEAN and LHe tanks. The heat exchanger discharges cold helium directly to the atmosphere. This embodiment is simpler and is less than half the weight of the $LN_2$ HAN TEAN embodiment. Advanced versions of the GG could use HAN TEAN with lower concentrations of water (from 10–7% are feasible), which will improve combustion efficiency. Any water concentration below 7% renders HAN TEAN unstable. Again, an optional catalyst bed 32 can be used to precondition the HAN TEAN propellant by exothermically decomposing the HAN into nitric acid and raising the temperature to approximately 250° F., thus aiding ignition.

The HAN TEAN mixing gas generator system stores working pressure gases as liquids, thereby reducing system volume by approximately a factor of four, reducing system weight by an estimated 25%, and eliminating high pressure storage vessels. The system is simple and reliable, light weight, and has few moving parts, and is, therefore, low in cost. HAN TEAN's combustion products of water, carbon dioxide and nitrogen are essentially compatible with many types of common rocket propellants used in the aerospace industry.

Many variations of the mixing gas generator propellant tank pressurization system would be readily apparent to one skilled in the art. The basic idea uses the heat of reaction of HAN TEAN to change the phase of a cryogenic primary working fluid to a gas. The benign high-temperature, high-pressure gases of the HAN TEAN combustion are combined with the liquid cryogenic working fluid to change its phase to a gas and to cool the HAN TEAN combustion products. This mixture is then used to pressurize the rocket's main propellant tanks.

I claim:

1. A method to pressurize a pressure-fed liquid rocket's main propellant tanks, the method comprising:
    a. providing a supply of HAN TEAN liquid propellant and a supply of a cryogenic or water working fluid in tanks, both tanks maintained at a high pressure level through a common high pressure source;
    b. injecting the HAN TEAN into a gas generator combustion chamber and igniting it, whereby the liquid propellant is combusted yielding high temperature exhaust products of water, carbon dioxide, and nitrogen;
    c. passing the HAN TEAN exhaust products through a sonic nozzle;
    d. providing a manifold at the exit end of the sonic nozzle into which the working fluid is injected to thereby change the working fluid phase to a gas;
    e. mixing said working fluid gas with the HAN TEAN exhaust products to thereby creating a high-pressure warm gas mixture; and
    f. directing said gas mixture to the main propellant tanks of the rocket.

2. The method of claim 1, wherein the working fluid is liquid nitrogen.

3. The method of claim 1, wherein a portion of the cryogenic working fluid is directed to regeneratively cool the gas generator.

4. The method of claim 1, wherein the HAN TEAN fluid is first passed through a catalyst bed to thereby decompose the HAN and raising the temperature to aid combustion.

5. A method to pressurize a pressure-fed liquid rocket's main propellant tanks, the method comprising:
    a. providing a supply of HAN TEAN liquid propellant and a supply of a cryogenic working fluid in tanks, both tanks initially charged to the same high pressure level and each tank having a common pressurization line;
    b. providing a heat exchanger in said cryogenic working fluid tank;
    c. injecting the HAN TEAN into a gas generator combustion chamber whereby the liquid propellant is combusted yielding high temperature exhaust products of water, carbon dioxide, and nitrogen;
    d. passing the HAN TEAN exhaust products through a sonic nozzle;
    e. providing a manifold at the exit end of the sonic nozzle into which the cryogenic working fluid is injected to thereby change the cryogenic working fluid phase to a gas;
    f. tapping off of the manifold a first portion of said working fluid gas and passing said working fluid gas through the heat exchanger to thereby maintain a high pressure level in the HAN TEAN and cryogenic working fluid tanks;
    g. mixing the remaining portion of said cryogenic working fluid gas with the HAN TEAN exhaust products to thereby creating a high-pressure warm gas mixture; and
    h. directing said gas mixture to the main propellant tanks of the rocket.

6. The method of claim 5, wherein the cryogenic working fluid is liquid helium.

7. The method of claim 5, wherein a portion of the cryogenic working fluid is directed to regeneratively cool the gas generator prior to being injected into said manifold.

8. The method of claim 5, wherein the HAN TEAN fluid is first passed through a catalyst bed to thereby decompose the HAN and raising the temperature to aid combustion.

* * * * *